United States Patent [19]

Sadler

[11] 4,170,983

[45] Oct. 16, 1979

[54] SOLAR HEATER

[76] Inventor: Charlton Sadler, P.O. Box 446, Brookville, Fla. 33512

[21] Appl. No.: 921,053

[22] Filed: Jun. 30, 1978

[51] Int. Cl.$^2$ ............................................. F24J 3/02
[52] U.S. Cl. ..................................... 126/450; 165/170
[58] Field of Search ............... 126/270, 271; 237/1 A; 165/170

[56] References Cited

U.S. PATENT DOCUMENTS

| | | | |
|---|---|---|---|
| 3,399,664 | 9/1968 | Suhay | 126/271 |
| 3,989,031 | 11/1976 | Thomason et al. | 126/270 |
| 4,023,556 | 5/1977 | Sarazin et al. | 126/271 |
| 4,056,092 | 11/1977 | Meier et al. | 126/271 |
| 4,085,728 | 4/1978 | Tomchak | 165/170 |
| 4,114,597 | 9/1978 | Erb | 165/170 |
| 4,114,599 | 9/1978 | Stephens | 126/270 X |
| 4,138,991 | 2/1979 | Lorenz | 126/270 |

Primary Examiner—Samuel Scott
Assistant Examiner—Larry Jones
Attorney, Agent, or Firm—Stein & Frijouf

[57] ABSTRACT

A novel solar collector is disclosed and described comprising a base and a plurality of upstanding walls extending about the perimeter of the base. An input and an output extend through the walls to communicate with a plurality of liquid conduits integral with the base. A transparent cover is secured to the upstanding walls for covering the base and the plurality of conduits. The conduits and the base with the upstanding walls are constructed of a one-piece molding of a curable material.

8 Claims, 16 Drawing Figures

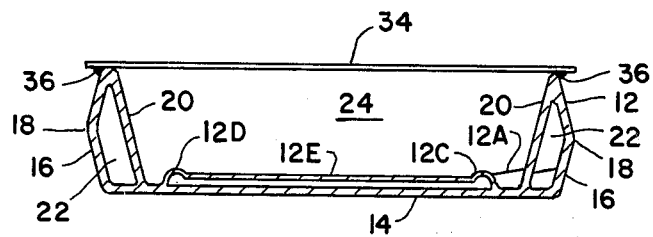
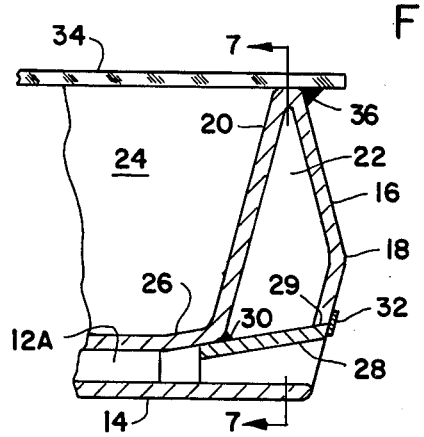
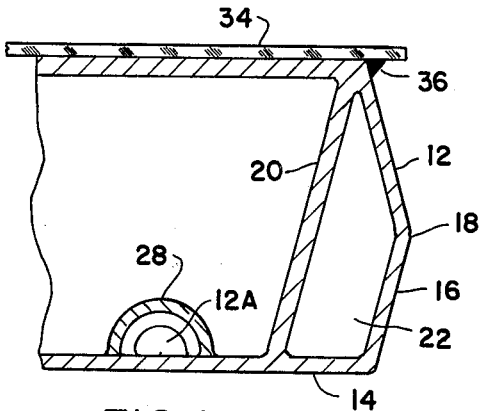
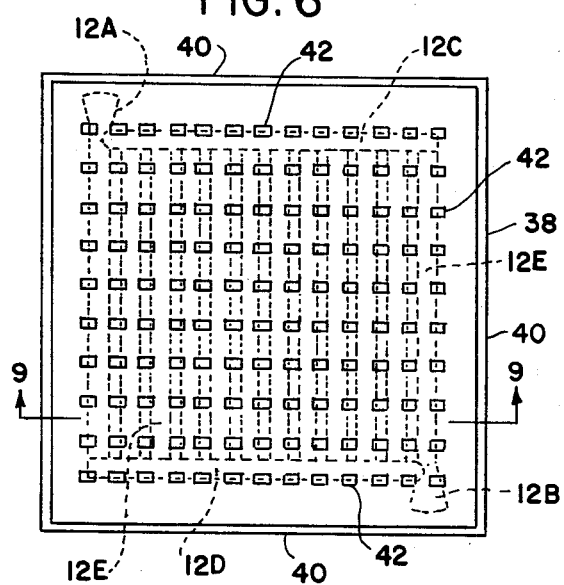
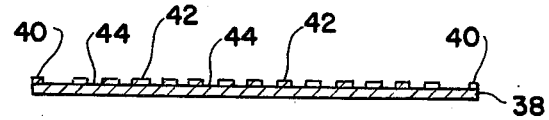
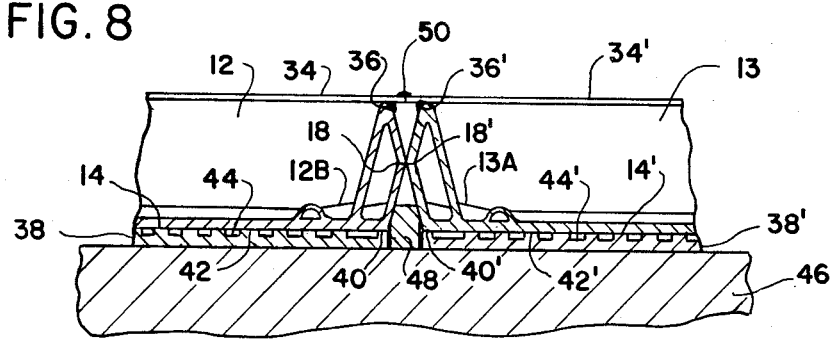

SOLAR HEATER

BACKGROUND OF THE INVENTION

1. Field of the Invention

This invention relates to solar energy and more particularly to a novel apparatus for forming a solar collector through a molding process.

2. Description of the Prior Art

The substantial increase in the cost of fossil fuel has encouraged investigation into alternate forms of energy to meet the needs of coming generations. Significant emphasis has been placed on the investigation of nuclear power, wind power, wave power and solar power. Among the most promising of these alternate forms of energy is the collection of solar energy. Solar energy has the advantage of being environmentally safe and producing no waste product. In addition, the source of power is essentially limited only by the number of collectors constructed. Solar collectors are also capable of operation in almost any location without concern for environmental impact on the location.

Unfortunately, solar collectors have not found widespread use in the art since the present collectors are low in efficiency of operation. Inefficient operation, per se, is not objectionable, but the present cost of solar collectors makes the state-of-the-art solar collector uneconomical for most purposes. The most promising of all solar collectors is the liquid heating solar collectors which are capable of mounting on the roof of commercial and residential buildings. The relatively high cost of these units has discouraged the widespread use of these units on residential and commercial buildings. In addition, the state-of-the-art solar collectors cannot withstand the ambient exposure and degrade with time.

Accordingly, there is a need in the art for an inexpensive and reliable solar water collector which is economically feasible for use with residential and commercial buildings.

Therefore it is an object of this invention to provide an apparatus which overcomes the aforementioned inadequacies of the prior art devices and provides an improvement which is a significant contribution to the advancement of the solar collecting art.

Another object of this invention is to provide a solar collector including a base and a plurality of upstanding walls extending about the perimeter of the base with a plurality of conduits interconnecting an input and an output with the conduits and the base being a one-piece molding of a curable material.

Another object of this invention is to provide a solar collector which is constructed of a substantially one-piece molded ceramic material resulting in a low cost, highly reliable solar collector for residential and commercial use.

Another object of this invention is to provide a solar collector which may be manufactured through a very simple process using readily available materials and techniques such that the resultant solar collector may be manufactured throughout the world.

Another object of this invention is to provide a solar collector which is constructed of a one-piece molding of a material such as ceramic or the like which has a proven durability in hostile environments.

Other objects and a fuller understanding of this invention may be had by referring to the summary of the invention, the description and the claims, taken in conjunction with the accompanying drawings.

SUMMARY OF THE INVENTION

The invention may be incorporated into an apparatus and the method of making a solar collector. The solar collector includes a base and a liquid input and output. A plurality of liquid conduit interconnect the input and the output and may be arranged in a substantially parallel array therebetween. A transparent cover is secured relative to the base for covering the base and the plurality of conduits. The plurality of conduits and the base are molded from a single piece of curable material thereby transferring heat collected by the base to the liquid internal the liquid conduit. The transparent cover member is mounted to upstanding walls extending about the perimeter of the base to form an enclosure for the plurality of conduits.

The invention also resides in the method of forming the solar collector of a curable material, such as ceramic or the like. The method of forming the solar collector comprises positioning a first and a second mold element relative to one another to form a mold cavity which defines the outer configuration of the solar collector. The first and second mold elements may be made of a liquid absorbing material and formed through a molding process from a material such as plaster or the like. The mold cavity is filled with a curable material which preferably cures upon the loss of liquid. The mold material first begins to cure adjacent the first and second mold element. After a period of time, the mold cavity is drained thereby removing the uncured internal material to define the internal configuration of the solar collector. The partially cured mold material is then retained within the mold cavity to further cure the mold material prior to removal from the mold cavity.

In a specific example of the foregoing method, a ceramic material is removed from the mold cavity and the input and output conduits are then installed. The internal portions of the conduits are glazed prior to firing the cured mold material. The resultant device provides a low cost, highly reliable solar collector which is lightweight and inexpensive.

The foregoing summary has described the method of forming the solar collector in terms of a liquid ceramic material and the like. It should be appreciated that the disclosed method may also take the form of blowing a filler material such as sand or the like with thermal setting resin into a heated first and second mold elements defining a mold cavity. In this embodiment, the mold material adjacent the first and second mold elements is bonded into a rigid structure whereas the mold material internal the mold cavity may be drained from the mold cavity after partially curing the mold material.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purpose of the present invention. It should be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 5 is a sectional view along line 5—5 of the solar collector shown in FIG. 2;

FIG. 6 is an enlarged view along line 6—6 of a portion of the solar collector shown in FIG. 2;

FIG. 7 is a sectional view along line 7—7 of the portion of the solar collector shown in FIG. 6;

FIG. 8 is a plan view of an auxiliary base for providing insulation beneath the solar collector shown in FIG. 2;

FIG. 9 is a side sectional view along line 9—9 of the auxiliary base shown in FIG. 8;

FIG. 10 is an enlarged sectional view of the abutment of two of the solar collector members shown in FIG. 1;

Similar reference characters refer to similar parts throughout the several views of the drawings.

DETAILED DESCRIPTION

Figure 1:
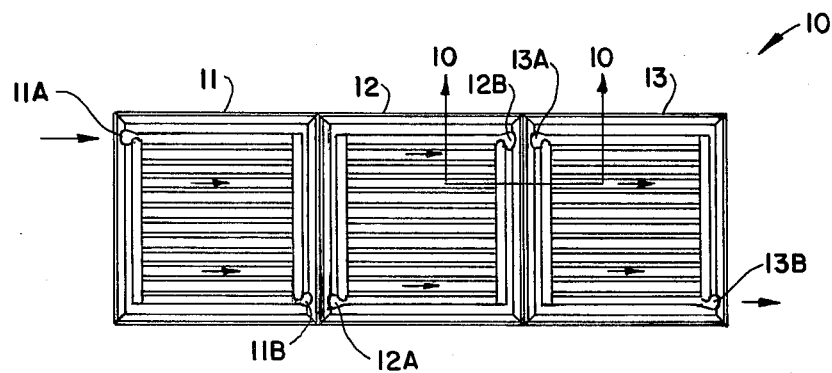
FIG. 1 is a plan view of three solar collector members interconnected in a series array.
Figure 2:
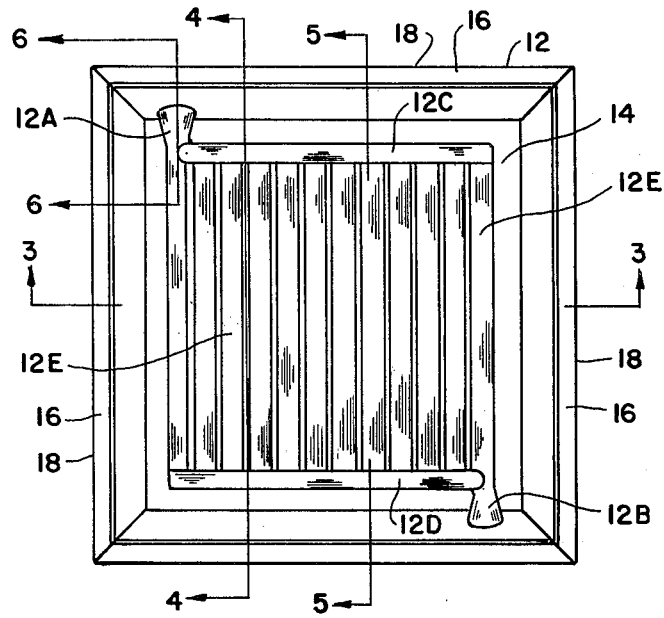
FIG. 2 is an enlarged plan view of one of the solar collector members shown in FIG. 1.
Figure 3:
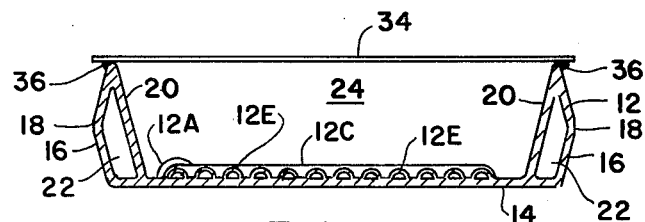
FIG. 3 is a sectional view along line 3—3 of the solar collector shown in FIG. 2.
Figure 4:
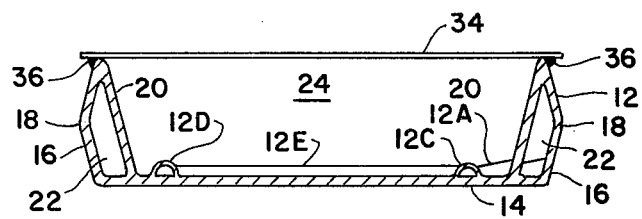
FIG. 4 is a sectional view along line 4—4 of the solar collector shown in FIG. 2.

FIG. 1 is an elevational view of a solar collector system 10 comprising a first collector member 11, a second collector member 12 and a third collector member 13 interconnected in a series array. An input 11A of the first collector member receives an incoming fluid which is heated by the first collector member 11. The output 11B of the first collector member 11 is connected to input 12A of the second collector member 12. The heated fluid from the second collector member 12 exits through an output 12B into an input 13A of the third collector member 13. The heated fluid exits through an output 13B of third collector member 13. The first and third collector members 11 and 13 are identical with one another whereas the second collector member 12 has the input 12A and the output 12B located on opposed ends of the collector unit 12. It should be understood that various arrangements and arrays and numbers of collector members can be utilized for specific applications.

FIGS. 2-7 illustrate more detailed views of the second solar collector member 12. It should be understood that the first and third solar collector members 11 and 13 are similar in arrangement but for the placement of the input and output. The collector member 12 comprises a base 14 and a plurality of upstanding walls 16 extending from and about the perimeter of base 14. The upstanding walls 16 taper inwardly from an outer perimeter 18 for aiding in the adjacent coupling of plural collector members as will be described hereinafter. An inner wall 20 provides an insulating air space 22 for the interior 24 of the collector member 12. The input 12A is shown having an outward taper 26 for receiving an auxiliary input conduit 28. The auxiliary input conduit 28 is shown as a tapering conduit having a substantially half-circular cross-sectional area which is received within a hole 29 to cooperate with the base 14 for completing the input channel 12A. The auxiliary input conduit 28 may be secured by securing means 30 and 32 which will be described more fully hereinafter. The output 12B is fashioned in a similar manner as the input 12A such that the input 12A and output 12B are interchangeable in function.

The input 12A is connected to a manifold 12C whereas the output 12B is connected to a manifold 12D. A plurality of substantially parallel conduits 12E interconnect the input and output manifolds 12C and 12D enabling the input fluid to flow from input 12A to be distributed by input manifold 12C to the plurality of conduits 12E. The heated fluid is collected by output manifold 12D from exit to the output 12B. In this embodiment, each of the conduits of 12E is integrally formed with the base 14 which base is integrally formed with the upstanding walls 16 and the inner walls 20. In a similar manner the input 12A and output 12B in addition to the input and output manifolds 12C and 12D are integrally formed with the base 14. The auxiliary input conduit 28 and corresponding output conduit (not shown) are separate pieces from the one-piece assembly.

A transparent cover 34 is secured to the upper perimeter of the upstanding walls 16 by means which may comprise either mechanical or adhesive means or the like. The internal surfaces of the interior 24 are preferably darkened to increase the absorbence of radiation to increase the heat transfer to the fluid flowing through the solar collector member 12.

FIGS. 8 and 9 are plan and sectional views of an auxiliary base 38 which is used to support the base 14 of the solar collector as shown in FIG. 10. The auxiliary base 38 comprises an upstanding wall 40 for supporting the outer perimeter of base 14 of the solar collector member 12. A plurality of projections 42 shown as subtantially truncated pyramids, extend from the auxiliary base 38 to contact and support strategic portions of base 14. FIG. 8 shows the position of the projections 42 for supporting the input 12A, the output 12B, the conduits 12E, as well as the manifolds 12C and 12D shown in phantom. The projections 42 create insulating air spaces 44 which insulate the base 14 from a mounting support 46 such as a roof or the like. The projections 42 are located between the conduits 12E to reduce heat loss from the fluid through the projections.

FIG. 10 illustrates the adjacent mounting of collector members 12 and 13 of FIG. 1. In this embodiment, the outer perimeters 18 and 18' of collector 12 and 13 abut one another enabling a positioning rail 48 to extend about the perimeter of base 14 to position the collector members 12 and 13 relative to one another on mounting support 46. The transparent covers 34 and 34' of the adjacent collector members 12 and 13 are joined by an adhesive or the like 50 which may be a silicon compound. FIG. 10 also shows the interrelation of auxiliary bases 38 and 38' relative to the collector members 12 and 13.

Figure 11:
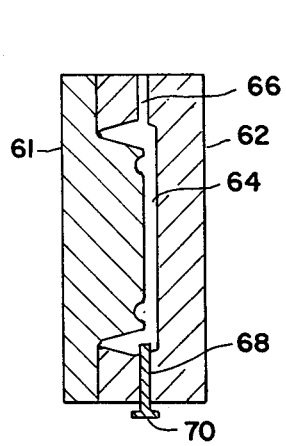
FIG. 11 shows the formation of a mold cavity which is the first step in forming the solar collector shown in FIGS. 2-7.

The invention also resides in the method of forming the solar collector which is shown in FIGS. 11-16. FIG. 11 shows a first and a second mold element 61 and 62 positioned to contact one another forming a mold cavity 64. The mold elements 61 and 62 are preferably made of a liquid-absorbing material such as plaster. The mold elements 61 and 62 may be molded from a plug in a conventional manner. The mold cavity 64 defines the outer configuration of the solar collector member 12. It should be appreciated that distinct first and second mold elements 61 and 62 may be utilized for solar collector members 11 and 12. The second mold element 62 comprises an input 66 and an output 68 with a non-liquid absorbing plug 70 sealing output 68 and extending into the mold cavity 64 as shown.

Figure 12:
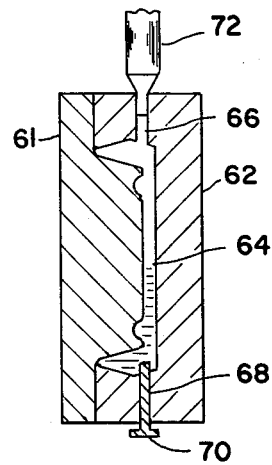
FIG. 12 shows the introduction of a curable mold material into the mold cavity which is the second step in forming the solar collector shown in FIGS. 2-7.

FIG. 12 shows the second step in the method of forming the solar collector 12 wherein a filler nozzle 72 extends into input 66 to fill mold cavity 64 with a material which cures upon loss of liquid. Preferably, the curable material may be a clay material commonly known in the art as slip.

Figure 13:
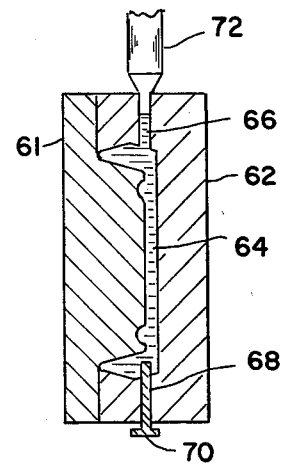
FIG. 13 illustrates the partial curing of the curable mold material within the mold cavity which is the third step in forming the solar collector shown in FIGS. 2-7.

FIG. 13 illustrates the third step in the method of forming the solar collector 12 wherein the mold cavity 64 is entirely filled with the curable mold material. The curable mold material adjacent the mold elements 61 and 62 cures due to the liquid absorption of the mold elements 61 and 62. The curable mold material in the central internal portion of the mold cavity 64 does not cure due to a lack of liquid absorption by mold elements 61 and 62.

Figure 14:
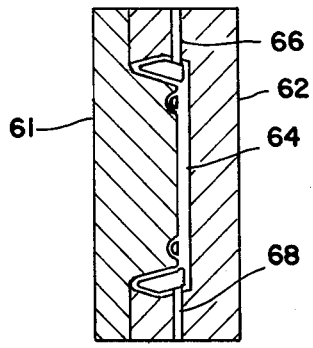
FIG. 14 illustrates the removal of uncured curable mold material from the mold cavity which is the fourth step in forming the solar collector shown in FIGS. 2-7.

FIG. 14 illustrates the fourth step in the process of forming the solar collector member wherein the plug 70 is removed from output 68 enabling the uncured mold material internal the mold cavity to flow out the output 68. For example, if a preferred wall thickness of one-eighth inch is desired, then the curable mold material will be maintained within mold cavity 64 for a duration sufficient to solidify all the curable mold material one-eighth of an inch adjacent the mold cavity wall. Under these conditions, all of the curable mold material more than one-eighth of an inch from the wall of cavity 64 will be in liquid form and will be removed from the mold cavity upon removal of plug 70. Since plug 70 is made of a non-liquid absorbing material, the curable mold material adjacent the plug 70 will not solidify enabling the uncured mold material to be removed upon removal of plug 70. It has been determined that a duration of 30 minutes at a preferred temperature of approximately 70° F. is sufficient to partially cure slip such that the outer configuration of the solar collector member is solidified whereas the internal portion remains a liquid. It is also desirable to keep the cured mold material in the mold cavity 64 for a period of eighteen hours after removal of the uncured mold material to insure that the curable material is sufficiently cured to handle. The condition of the solar collector is generally referred to in the ceramic art as "greenwear".

Figure 15:
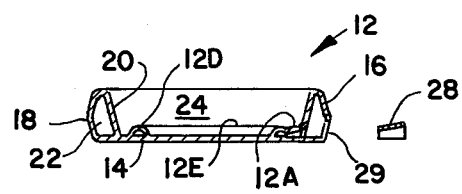
FIG. 15 illustrates the introduction of an intake port which is the fifth step in forming the solar collector shown in FIGS. 2-7.

FIG. 15 illustrates the fifth step in the process of forming the solar collector member 12 wherein the collector member 12 is removed from the mold cavity 64. When using a curable mold material such as slip, it is desirable to allow the collector member 12 to cure in atmospheric conditions for a period of two days. FIG. 15 also shows the installation of auxiliary input conduit through the aperture 29 formed in the upstanding wall 16. The auxiliary input conduit 28 engages the taper 26 of the input conduit 12A. The securing means 30 and 32 may take the form of a glazing material or may be additional clay material which is molded to seal the auxiliary input conduit 28 to the remainder of the collector member 12. The output 12B is formed in a similar manner. The internal apertures and conduits of the solar collector 12 are then glazed with a glazing material and fired for a period of approximately three hours at 200° F. The internal surfaces of the interior 24 are coated with a light absorbing material such as lamp black or the like.

Figure 16:
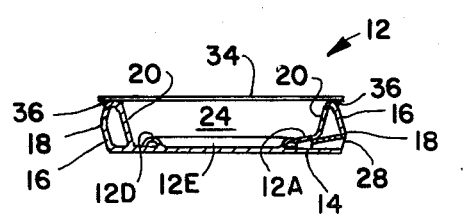
FIG. 16 illustrates the mounting of a transparent surface on the top of the solar collector which is the sixth step in forming of the solar collector shown in FIGS. 2-7.

FIG. 16 illustrates the final step of the method of forming the solar collector wherein the transparent cover 34 is secured to the upper portion of upstanding walls 16. The transparent cover 34 may be a plastic or glass material secured by suitable adhesive 36 or equivalent mechanical means.

The solar collector may then be connected in an array as shown in FIGS. 1 and 10 by the use of teflon conduits connected with O-rings into the input and output of the solar collector members.

In a preferred form of the solar collector, heretofore described, the collectors are each made of a ceramic material having a 24 inch by 24 inch dimension which collector is cured, glazed and fired to provide a durable and long lasting unit. History has established the fact that ceramic material is durable for use as a roof tile and the like. Accordingly, the instant invention provides a system which is low cost and durable resulting in a feasible solar collector for commercial and domestic installation. The raw material costs and manufacturing costs are extremely low in comparison to conventional aluminum, copper or other metallic solar collectors now known to the art.

Although the invention has been disclosed in its preferred form as being constructed of a one-piece ceramic material, in combination with an auxiliary input and output conduit and an upper transparent cover, it should be understood that the mold cavity 64 may be altered to directly provide the input and output. In addition, other materials and variations of this process may be used to obtain the disclosed benefits of the invention, and such variations should be construed as to be equivalent to the instant disclosure.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described, I claim:
1. A solar collector comprising in combination:
 a collector member having a base and a plurality of upstanding walls extending about the perimeter of said base;
 a fluid input and a fluid output;

a fluid input manifold and a fluid output manifold respectively connected to said fluid input and said fluid output;

a plurality of fluid conduits interconnecting said input and said output manifolds forming a plurality of fluid tight paths between said fluid input and said fluid output;

a transparent cover member secured to said upstanding walls forming an internal area for enclosing said manifolds and said plurality of conduits; and said plurality of conduits and said manifolds and said base and said upstanding walls being a one-piece molding of a curable material for transferring heat collected by said collector to a fluid flowing internal of said plurality of conduits.

2. A solar collector as set forth in claim 1, wherein said plurality of conduits are established in a substantially parallel array between said input and said output manifolds.

3. A solar collector as set forth in claim 2, wherein said transparent cover is received in parallel relationship relative to said base.

4. A solar collector comprising in combination:
a solar collector member including a base and a plurality of upstanding walls extending from and about the perimeter of said base;

a fluid input and fluid output extending through the walls of said collector;

a fluid input manifold and a fluid output manifold respectively connected to said fluid input and said fluid output;

a plurality of fluid conduits interconnecting said fluid input and said fluid output manifolds forming a plurality of fluid tight paths between said fluid input and said fluid output;

a transparent cover member securing to said upstanding walls for covering said manifolds and said plurality of conduits;

said plurality of conduits and said manifolds and said base and said upstanding walls being a one-piece molding of a curable material and said one piece molding of said base and said upstanding walls cooperating with said secured transparent cover member for forming an enclosed internal volume with said plurality of fluid conduits disposed therein.

5. A solar collector as set forth in claim 4, wherein said plurality of conduits extends along said base.

6. A solar collector as set forth in claim 5, wherein said collector member is a one-piece molding of a ceramic material.

7. A solar collector as set forth in claim 4, wherein each of said upstanding walls taper inwardly toward said solar collector member from a location between the bottom and top edges of said upstanding walls; and a positioning rail cooperating with said taper for positioning adjacent solar collector members relative to one another.

8. A solar collector as set forth in claim 4 including an auxiliary base having a plurality of upwardly extending projections; and said upwardly extending projections supporting said solar collector member thereby creating an insulating air space therebetween.

* * * * *